(12) United States Patent
Bengs et al.

(10) Patent No.: US 6,406,530 B1
(45) Date of Patent: Jun. 18, 2002

(54) BIOPOLYMER-BASED THERMOPLASTIC MIXTURE FOR PRODUCING BIODEGRADABLE SHAPED BODIES

(75) Inventors: Holger Bengs; Gitte Böhm, both of Frankfurt (DE)

(73) Assignee: Aventis Research & Technologies GmbH & Co KG (DE)

(*) Notice: Subject to any disclaimer, the term of this patent is extended or adjusted under 35 U.S.C. 154(b) by 0 days.

(21) Appl. No.: 09/462,524

(22) PCT Filed: Jun. 26, 1998

(86) PCT No.: PCT/EP98/03922

§ 371 (c)(1),
(2), (4) Date: Mar. 13, 2000

(87) PCT Pub. No.: WO99/02596

PCT Pub. Date: Jan. 21, 1999

(30) Foreign Application Priority Data

Jul. 9, 1997 (DE) .......................................... 197 29 268

(51) Int. Cl.[7] ........................... C08L 3/02; C08L 89/00; C08L 97/00
(52) U.S. Cl. ................. 106/137.1; 106/145.1; 106/162.1; 106/162.5; 106/162.51
(58) Field of Search ............................ 106/137.1, 145.1, 106/162.1, 162.5, 162.51

(56) References Cited

U.S. PATENT DOCUMENTS 2,355,180 A    8/1944  Remy
4,183,997 A *  1/1980  Stofko ........................ 428/326

FOREIGN PATENT DOCUMENTS

| DE | 4014176 | 11/1991 |
| DE | 4331747 | 3/1995 |
| GB | 476344 | 7/1937 |
| WO | 95/04111 | 2/1995 |
| WO | 98/06785 | 2/1998 |

* cited by examiner

*Primary Examiner*—Nathan M. Nutter
(74) *Attorney, Agent, or Firm*—Connolly Bove Lodge & Hutz LLP

(57) ABSTRACT

Thermoplastic mixture based on biopolymers for producing shaped biodegradable articles with improved properties, preparation of the mixture, and also its use. A novel thermoplastic mixture based on biopolymers, in particular on starch, features the presence of lignin and is used for producing shaped biodegradable articles with improved properties, preferably with improved mechanical properties. The mixture is preferably obtained by preparing, and mixing with one another, A) 100 parts by weight of one or more physiologically nonhazardous, biodegradable, thermoplastically processable polymeric materials selected from the group consisting of polysaccharides and proteins, preferably at least one starch of any type which is native, chemically modified, fermentative, recombinant and/or prepared by biotransformation, and/or derivatives of the starches mentioned;

B) from 10 to 100 parts by weight of water;

C) from 1 to 100 parts by weight of lignin;

D) if desired, up to 50 parts by weight of at least one plasticizer; and

E) if desired, up to 200 parts by weight, preferably not more than 100 parts by weight, of other conventional additives;

where the components are thermoplastified with introduction of thermal and mechanical energy into the mixture, preferably at an elevated temperature and with simultaneous exertion of shear forces onto the mixture. Surprisingly, the use of lignin with thermoplastic materials based on biopolymers, in particular based on starch, leads to improved thermoplastic materials which have advantages in particular in terms of their mechanical properties or other performance characteristics.

14 Claims, No Drawings

BIOPOLYMER-BASED THERMOPLASTIC MIXTURE FOR PRODUCING BIODEGRADABLE SHAPED BODIES

CROSS REFERENCE TO RELATED APPLICATION

This application is a 371 of PCT/EP98/03922 dated Jun. 26, 1998.

BACKGROUND OF THE INVENTION

The invention relates to the field of thermoplastic processing of polymeric materials. In particular, the invention relates to thermoplastic mixtures based on biopolymers, preferably starch, the preparation of mixtures of this type, and also the use of these mixtures for producing shaped biodegradable articles, such as moldings or films, which have improved properties, for example improved mechanical properties.

The industrial sector concerned with biopolymers is enjoying constantly increasing interest, due primarily to environmental factors.

Biopolymers, such as polysaccharides and proteins, are biocompatible materials and as such have the great advantage of fundamentally good biodegradability and biocompatibility. The increased use of what are known as hydrophilic polymers as natural and, together with this, physiologically compatible and biodegradable plastics for a wide variety of application sectors, is also leading to considerable efforts to process biopolymers of this type, including starch, using known plastics-processing techniques, e.g. injection molding or extrusion. However, products produced in this way, such as moldings or films, frequently have inadequate mechanical properties, for example insufficient strength, and there is also frequently a lack of cost-effective methods for preparing appropriate starting materials for the products.

Limited improvements can be made by modifying the biopolymers chemically. There are many and varied reactions used to modify, for example, starch. These include oxidative processes, polymer-analogous reactions with organic chemicals and crosslinking reactions.

In the further processing of biopolymer mixtures, in particular starch mixtures, using conventional polymer-processing technology it is in most cases of interest to melt the polymer mixture (e.g. in injection molding, blow molding, extrusion, coextrusion or extrusion with blowing). This requires thermoplastic behavior in the molding compositions based on biopolymers.

However, substances which have to be used to improve the plastification of the thermoplastic mixtures are frequently disadvantageous to the mechanical properties of the products manufactured from the thermoplastic mixture. If, for example, attempts are made to improve the thermoplastic behavior of, for example, starch by crosslinking, a process in which an important part is often played by bifunctional molecules based on aldehydes, such as glyoxal, glutaric dialdehyde or dialdehyde starch, or else those based on diisocyanates, on epoxides, or epichlorohydrin, diesters, etc., if the content of crosslinking agent is too high, the extent of the crosslinking reaction can hinder achievement of the desired effect, which is better plastification of the starch. In particular, relatively strong crosslinking results in an insoluble, though swellable, product.

For more detailed prior art regarding starch materials the following publications are cited:

WO 90/05161 (PCT/CH89/00185)=D1,
DE-A 39 31 363=D2,
DE 44 12 136=D3 and
DE 42 07 131=D4.

D1 describes the preparation of thermoplastically processable starch by admixing an additive with essentially native or natural starch and melting the mixture by introducing heat and mechanical energy. The additive is a substance which lowers the melting point of the starch, and the melting point of the starch together with this additive is therefore below the decomposition temperature of the starch. Specific examples of the additive are DMSO, 1,3-butanediol, glycerol, ethylene glycol, propylene glycol, butylene glycol, diglyceride, diglycol ether, formamide, N,N-dimethylformamide, N-methylformamide, N,N'-dimethylurea, dimethylacetamide and N-methylacetamide. D1 also proposes the addition of a crosslinking agent selected from the group consisting of the di- or polybasic carboxylic acids and/or anhydrides, the halides and/or amides of di- or polybasic carboxylic acids, the derivatives of di- or polybasic inorganic acids, epoxides, formaldehyde, the derivatives of urea, the divinyl sulfones, the isocyanates, mono- or polyfunctional oxo compounds, and also cyanamide.

D2 relates to a process for reducing the swellability of starch by modification, by adding a crosslinking reagent in a pure or encapsulated form and achieving the crosslinking reaction by subsequent annealing at elevated temperature. The crosslinking agents used are, inter alia, urea derivatives, urotropin, trioxane, di- or polyepoxides, di- or polychlorohydrins, di- or polyisocyanates, carbonic acid derivatives, diesters or else inorganic polyacids, such as phosphoric or boric acids. A feature of the mixtures described is- very high weight ratios of crosslinking agent used (from 10 to 100% by weight) in order to achieve an appropriate increase in mechanical stability through the subsequent thermal treatment.

Lignin is used, for example, in adhesives and glues, as described, for example, in D3. The heterogeneous mixture of ligninsulfonate with colophonium resin and starch gives, in an aqueous dispersion, a glue for gluing surfaces or objects.

D4 describes the use of liquid smoke flavorings in the production of tubular viscose casings or wrappings for food packaging by precipitation processes, with the aim of giving meat products in particular characteristic properties. A disadvantage is that the liquid flavoring has to be applied via further operations after the production process.

SUMMARY OF THE INVENTION

Bearing in mind the prior art described and discussed here, therefore, one object of the invention was to provide a thermoplastic mixture based on biopolymers, preferably starch, which permits the production of shaped biodegradable articles with improved properties, preferably with improved mechanical properties.

Another object of the invention was a process for preparing a thermoplastic mixture for extrudates or pelletized materials, together with the use of the thermoplastic mixture.

In a manner which is not readily foreseeable, the presence of an effective amount of lignin in a thermoplastic mixture based on biopolymers is successful in modifying the properties of materials of this type, where the proportion of lignin varies depending on the intended application. In film applications in particular, favorables effects can be seen on the mechanical properties and other performance charteristics, such as the odor of the film.

Because the lignin added is a natural material, it can also be used in the food and drink sector.

Due to its chemical nature, the lignin here gives both the the thermoplastic molding composition itself and also the shaped articles of any tape manufactured therefrom a pleasant aromatic odor. The unforeseeable effect is advantageously perceptible in particular when producing films or foils, and there is therefore a possible use as an aroma component or smoke substitute.

Alongside the effect on appearance, odor and taste, positive effects on the preservation behavior of the thermoplastic molding compositons, and also of shaped articles or films resulting therefrom, can arise.

Due to the processing temperatures required according to the invention, it was not readily foreseeable that a favorable effect of this type would result from the use of lignin or its derivatives.

The invention therefore consists primarily in the use of lignin for modifying thermoplastically processable materials, such as proteins and/or polyseccharides. Surprisingly, although lignin is omnipresent in the environment, no technical consideration has previously been given to the fact that combining a natural matrial isolated from timber, namely lignin, with proteins and/or polysaccharides, preferably polysaccharides, especially starch or its derivatives, gives an advantageous modificaton of thermoplastic mixtures in which these biopolymers are present and improves the properties of products produced therefrom.

Another advantage of the present invention, besides the improvements mentioned in the properties of the products, is that a rational use is provided for a previously unused waste material from papermaking. In addition, therefore, to the cost issue in that the cost of providing lignin is low, sustainable development is promoted.

The thermoplastic properties of the lignin which appear when water is added, and also its stabilizing effects when combined with biopolymers, preferably polysaccharides, are among the particular advantages of the novel thermoplastic mixtures.

Using lignin in thermoplastic molding compositions moreover makes it possible to dispense with the addition of a plasticizer, since lignin also has plasticizing properties.

DETAILED DESCRIPTION OF THE INVENTION

In a very particularly preferred embodiment, the novel thermoplastic mixtures are based on starch.

A useful embodiment of the invention provides moreover for a ratio by weight of lignin to biopolymer, preferably starch, within the range from 1:1000 to 1:1, preferably from 1:100 to 1:2.

It is moreover particularly advantageous for the biopolymer to be starch which is native, chemically modified, obtained by a fermentative process, obtained by a recombinant process and/or prepared by biotransformation, or to be a polysaccharide, or to be a derivative of the types of starch mentioned, or to be a mixture of one or more of the abovementioned starches and/or derivatives of starch.

In particular, very good thermoplastic modifications of the biopolymers are obtained if the lignin is an alkali lignin.

Of particular interest for the invention are thermoplastic mixtures comprising

A) from 33 to 90% by weight of one or more physiologically nonhazardous, biodegradable, thermoplastically processable polymeric materials (biopolymers) selected from the group consisting of polysaccharides and proteins;

B) from 5 to 35% by weight of water;

C) from 0.5 to 33% by weight of lignin; where components A) to E) together give 100% by weight; and also, if desired, D) up to 50 parts by weight, based on 100 parts by weight of the total of components A) to C), of one or more plasticizers; and E) up to 200 parts by weight, preferably not more than 100 parts by weight, based on 100 parts by weight of the total of components A) to C), of other conventional additives.

The thermoplastically processable biopolymer-based, preferably starch-based, mixtures provided by this means have excellent thermoplastic processability, can be processed to give moldings which have superior mechanical properties and are nevertheless readily biodegradable, for example can rot or be composted.

The products, such as shaped articles or films, are substantially biocompatible and, if desired, edible, opening up a route to edible packaging, i.e. in particular packaging for food or drink.

For the purposes of the present invention, packaging for food or drink here is either outer packaging for food or drink, coming into only short-lived contact therewith, or else packaging, such as tubes, casings, wrappings or coatings, the inner surface of which is in continuous contact with the food or drink, so that the packaging may even be ingested with the food or drink. The packaging is therefore suitable for, inter alia, fruit, eggs, cheese, confectionery, cakes, biscuits, effervescent tablets, drinks, meat, sausage products or sausage-meat emulsion.

The use here of the shaped articles which can be obtained according to the invention from the thermoplastic molding compositions is not restricted to the use in combination with short-lived products, but can also extend to short-lived use for protecting consumer articles or commercial assets during shipping or storage. Particular consideration should be given here to protection from exposure to climatic conditions as encountered, for example, when automobiles are shipped overseas.

Surprisingly, it has now been found in particular that the use of particular defined additives, such as lignin, under specific conditions, achieves effects which on the one hand modify the biopolymers, preferably the starch, and on the other hand permit further processing of the biopolymer, in particular of the starch, using conventional thermoplastics processing techniques.

Under the specific conditions according to the invention, the modification reaction can be carried out during processing. Even at low concentrations, the additive according to the invention has a positive effect here on the properties and the processability of thermoplastic mixtures based on biopolymers.

Component A) of the Novel Thermoplastic Mixture Based on Biopolymers

Component A) is an essential component in the novel thermoplastically processable mixture.

It is a biopolymer, which for the purposes of the present invention is preferably more specifically a physiologically nonhazardous, and also substantially biodegradable, thermoplastically processable polymeric material, of which from 33 to 90% by weight may be present in the mixture of the invention. Component A) may also be a mixture of two or more compounds of this type.

One group of materials meeting these requirements is the proteins group.

Components A) which may be used successfully within the scope of the invention include gelatins, vegetable proteins, such as sunflower protein, soy protein, cottonseed protein, ground nut protein, rapeseed protein, plasma proteins, egg white, egg yolk and the like.

Advantageous mixtures are also given by zein, gluten (corn, potato), albumin, casein, creatin, collagen, elastin, fibroin and/or whey protein.

Polysaccharides are also of particular interest as component A).

Preference is given to the use of water-soluble polysaccharides, such as alginic acid and its salts, carrageenans, furcellaran, guar gum, agar-agar, gum arabic and related polysaccharides (ghafti gum, karaya gum, tragacanth gum), tamarind gum, xanthan gum, aralia gum, locust bean gum, arabinogalactan, pullulan, chitosan, dextrins and cellulose.

The presence of lentinan, laminarin, chitin, heparin, inulin, agarose, galactans, hyaluronic acid, dextrans, dextrins and/or glycogen can also be advantageous.

Particularly useful mixtures are obtained if component A) is one or more starches, one or more derivatives thereof or a mixture of starch and starch derivatives.

Preferred components A) are especially mixtures of the starch derivatives or starches mentioned, with one another or with other polysaccharides and/or with proteins.

An important group of starches comprises the starches obtained from vegetable raw materials. These include starches made from tubers, such as potatoes, cassava, maranta or sweet potato, from seeds, such as wheat, corn, rye, rice, barley, millet, oats or sorghum, from fruits, such as chestnuts, acorns, beans, peas and other pulses, or bananas, or from plant pith, for example of the sagopalm.

The starches which can be used for the purposes of the invention are composed substantially of amylose and amylopectin, in varying proportional quantities (depending on origin).

Particularly good results are achieved with, inter alia, starches made from potatoes (e.g. ®Toffena from Südstärke) or corn (e.g. Maize Starch from National Starch), or else from polyglucans, which feature a perfectly linear structure of the polymers.

The molecular weights of the starches which can be used according to the invention may vary over a wide range. The starches which can be used as a basis for the novel thermoplastic mixture are those which are composed substantially of a mixture of amylose and amylopectin, with molecular weights $M_w$ within the range from $5 \times 10^4$ to $1 \times 10^7$. Preference is given to relatively long-chain polymers with molecular weights $M_w$ of from $1 \times 10^6$ to $5 \times 10^6$.

Preference is also given to linear starches, preferably polyglucans, in particular 1,4-α-D-polyglucan, with molecular weights $M_w$ within the range from $5 \times 10^2$ to $1 \times 10^5$, preferably with molecular weights $M_w$ of from $1 \times 10^3$ to $5 \times 10^4$.

Besides molding compositions based on starches of native vegetable origin, the invention also includes thermoplastic mixtures or molding compositions with starches which have been chemically modified, have been obtained by fermentation, are of recombinant origin or have been prepared by biotransformation (or: biocatalysis).

For the purposes of the present invention, "chemically modified starches" are starches whose properties have been altered from their natural properties by chemical means. This is achieved substantially by polymer-analogous reactions in which starch is treated with mono-, bi- or polyfunctional reagents and/or oxidants. The hydroxyl groups of the polyglucans of the starch are preferably transformed here by etherification, esterification or selective oxidation, or the modification is based on a free-radical-initiated graft copolymerization of copolymerizable unsaturated monomers onto the starch backbone.

Particular chemically modified starches include starch esters, such as xanthogenates, acetates, phosphates, sulfates and nitrates, starch ethers, e.g. nonionic, anionic or cationic starch ethers, oxidized starches, such as dialdehyde starch, carboxy starch, persulfate-degraded starches and similar substances.

For the purposes of the present invention, "fermentative starches" are starches obtained by fermentative processes or obtainable by involving, or with assistance from, fermentative processes, using naturally occurring organisms, such as fungi, algae or bacteria. Examples of starches from fermentative processes are gum arabic and related polysaccharides (gellan gum, ghatti gum, karaya gum, gum tragacanth), xanthan, emulsan, rhamsan, wellan, schizophyllan, polygalacturonates, laminarin, amylose, amylopectin and pectins. "Starches of recombinant origin" or "recombinant starches" are specifically starches obtained by fermentative processes or obtainable by involving, or with assistance from, fermentative processes, not using organisms which occur naturally, but using naturally occurring organisms modified with the aid of genetic engineering techniques, for example fungi, algae or bacteria. Examples of starches from fermentative processes with genetic modification are amylose, amylopectin and polyglucans.

For the purposes of the present invention, "starches prepared by biotransformation" are starches, amylose, amylopectin or polyglucans prepared by a catalytic reaction of monomeric fundamental building blocks, generally of oligomeric saccharides, in particular of mono- or disaccharides, by using a biocatalyst (or:enzyme) under specific conditions. Examples of starches from biocatalytic processes are polyglucan and modified polyglucans, polyfructan and modified polyfructans.

Finally, advantageous thermoplastic mixtures may also be obtained using derivatives of the individual starches mentioned. For the purposes of the present invention, the terms derivatives of starches "and starch derivatives" very generally are modified starches, i.e. starches whose properties have been altered by changing the natural amylose/amylopectin ratio or carrying out a pregelatinization, a partial hydrolytic degradation or a chemical derivatization.

Examples of particular derivatives of starches are oxidized starches, e.g. dialdehyde starches or other oxidation products with carboxyl functions, or native ionic starches (e.g. with phosphate groups) or starches which have been further modified ionically, where this term covers both anionic and cationic modifications.

Particularly advantageous thermoplastic mixtures are obtained if the starches used have only a small proportion of other compounds which do not belong to the saccharides (e.g. proteins, fats, oils) (for example, and in particular, potato starch) or if ionic starches are used as base material or are admixed, and/or the starch basis used comprises polyglucans of exceptional homogeneity in terms of structure, molecular weight and purity, e.g. 1,4-α-D-polyglucan prepared by biotransformation. In the novel thermoplastic mixture a calculation is made in relation to component A) or to a mixture made from component A) to correct the water content to zero percent. This means that the water content of component A) is determined and the appropriate quantity is subtracted in arriving at 100 parts by weight, but taken into account in arriving at the amount of component B).

Component B) of the Novel Mixture

Component B) is an essential component in the novel mixture.

The mixture of the invention comprises from 5 to 35 percent by weight of water. If the amount of water is below 5 percent by weight there is inadequate destructuring and homogenization of the mixture. If the water content is above 35 percent by weight, there is a risk that the viscosity of the mixture will be too low.

Preferred water contents are approximately from 7.5 to 30 percent by weight, and proportions of from 10 to 25% by weight of water are particularly useful.

Within these preferred ranges the plastification of the mixture is ideal, i.e. destructuring of the biopolymers and homogenization and thermoplastification of the mixture take place.

The amount of water B) comprises both water actually added and also water content which derives from other components and which must be taken into account in calculations, in particular the amount of water present or bound within component A) and any water present or bound within the compounds C), D) or E).

Other aspects of the nature of component B) are substantially noncritical. Use may be made of demineralized water, deionized water, or equally well mains water or water from another source, as long as the content of salts or of other foreign substances in the water can be tolerated in the application intended.

Component C) of the Novel Mixture

Component C) is an essential component in the novel mixture.

The amount of component C) present in the mixture of the invention is from 0.5 to 35% by weight.

Preferred mixtures are obtained if the amount of component C) present in the mixture is at least 1% by weight.

Thermoplastic mixtures in which the amount of component C) present is within the range from 2.5 to 30% by weight are also of particular interest.

Thermoplastic mixtures in which the amount of component C) present is within the range from 5 to 25% by weight are particularly useful.

Component C) is lignin. This is a naturally occurring, high-molecular-weight aromatic substance which in woody plants fills the spaces between the cell membranes to produce timber. The term lignification is also used in this connection.

In particular, lignin has the task of controlling the liquid balance in the plants, providing strength, and also building up resistance to microorganisms.

Any lignin which can be obtained from a natural source may be used with the invention.

The structure of the lignin may be seen in terms of a relatively highmolecular-weight derivative of phenyl propane. Various types of linking give lignan and coumarin structures, cycl. ethers, lactones, etc.

Those with a molecular weight of from about 5000 to 10,000 Dalton are preferred.

Preference is also given to alkali lignins.

The use according to the invention is particularly astonishing since alkali lignin has hitherto been used as a binder for pressed sheets based on wood or on cellulose, as a dispersing agent, to clarify sugar solutions, to stabilize asphalt emulsions and to stabilize foams.

It should be emphasized here in particular that lignin can replace some or all of the plasticizer and also allows the products which can be produced from the thermoplastic molding compositions to be given an aromatic odor desirable for particular applications.

Component D) of the Novel Mixture

Component D) is optional in the novel mixture.

The amount of component D) is significant if the amount C) is insufficient, even with relatively high levels of mechanical and/or thermal energy, to achieve an adequate plasticizing effect. The amount of one or more plasticizers present in the composition of the invention is within the range of up to 50 parts by weight, based on 100 parts by weight of the total of components A) to C).

Preference is given to a novel mixture which has from 5 to 30 parts of plasticizer. Plastification is particularly good within this range. If the plasticizer content exceeds 50 parts by weight the plastification of the mixture does not improve significantly.

Amounts of plasticizers in the range from 7.5 to 25 parts by weight are also advantageous, and plasticizer contents within the range from 10 to 20 parts by weight, based in each case on 100 parts by weight of the total of components A) to C), are particularly useful.

For the purposes of the present invention, the terms plasticizing agent, plastification agent, plastifying agent and elastifying agent have the same meaning as plasticizer.

Use may be made of any inert, preferably organic, substance which generally has a low vapor pressure and which interacts physically with components A) and preferably forms a homogeneous system with these without any chemical reaction, preferably via its solvent or swelling power, or also in the absence of these.

The component D) to be used according to the invention preferably lowers the freezing point of the mixture, increases its deformability, enhances its elastic properties, reduces its hardness and, if desired, raises its adhesion.

According to the invention, preferred plasticizers are odorless, colorless, resistant to light, cold and heat, not more than slightly hygroscopic, resistant to water, not hazardous to health, flame-retardant and as involatile as possible, of neutral reaction and miscible with polymers and with auxiliaries, and have good gelling performance. In particular, they should have compatibility, gelling capability and plasticizing action with respect to components A).

The components to be used according to the invention as component D) should also feature low migration, and this is particularly important for applications of the shaped articles according to the invention in the food and drink sector.

Examples of particularly preferred plasticizing components D) are dimethyl sulfoxide, 1,3-butanediol, glycerol, ethylene glycol, propylene glycol, diglyceride, diglycol ether, formamide, N,N-dimethylformamide, N-methylformamide, dimethylacetamide, N-methylacetamide and/or N,N'-dimethylurea.

Particularly useful materials are polyalkylene oxide, glycerol mono-, di- or triacetate, sorbitol and other sugar alcohols, such as erythritol, sugar acids, polyhydroxycarboxylic acids, saccharides, such as glucose, fructose or sucrose, and also citric acid and its derivatives.

Component E) of the novel thermoplastic mixture based on biopolymer

Component E) is optional in the novel mixture. It may be one or more substances which may be used together as component E) in amounts of up to 200 parts by weight, preferably not more than 100 parts by weight, based on 100 parts by weight of the total of components A) to C).

Conventional additives include fillers, lubricants other than the plasticizers mentioned under D), flexibilizers, pigments, dyes and mold-release agents.

Examples of suitable fillers are synthetic polymers which are almost soluble in the mixture, for example lactic-acid-based polymers, such as ®Lacea from Mitsui, ®Resomer from Boehringer Ingelheim, and also other lactic-acid-based polymers and also similar lactic-acid polymers, from Wako Pure Chemical Industries Ltd., Medisorb Co., Birmingham Polymers Inc., Polysciences Inc., Purac Biochem BV, Ethicon, Cargill or Chronopo. This list clearly cannot be absolutely comprehensive. It is also possible to use biodegradable polyesters whose fundamental building blocks are not lactic acid or glycolic acid, but are preferably composed of physiologically nonhazardous hydroxycarboxylic acids. A representative substance of this type which may be mentioned here is a copolyester based on hydroxybutyric acid and hydrovaleric acid, ®Biopol.

The addition of at least one inorganic filler, such as magnesium oxide, aluminum oxide, $SiO_2$, $TiO_2$, etc., is also proposed.

For pigmenting the mixture, organic or inorganic pigments are particularly suitable, and also in particular pearl-luster pigments which are biocompatible, i.e. can be classified as nonhazardous to living organisms. These are based on silicate structures and can therefore in principle be classified as edible, and are used in amounts of from 0.001 to 10 parts by weight.

Materials particularly suitable for improving the flow properties are animal or vegetable fats and/or lecithins, preferably used in hydrogenated form. These fats and other fatty acid derivatives preferably have a melting point above 50° C.

In order to reduce the hydrophilic character and thus the sensitivity of the thermoplastically processable mixture to water during and after processing a subordinate amount of a crosslinking agent may be added to the mixture, in order to modify the starch chemically. To this end, use is preferably made of amounts of up to 5 parts by weight of alkylsiloxanes.

Suitable crosslinking agents are, inter alia, di- or polyhydric carboxylic acids, and also anhydrides of these, acid halides of di- or polybasic carboxylic acids, amides of di- or polybasic carboxylic acids, derivatives of di- or polybasic inorganic acids, epoxides, formaldehyde and/or urea derivatives, divinyl sulfones, isocyanates, oxo compounds and/or cyanamide. These compounds are also particularly suitable for chemical modification after the thermoplastic processing and can therefore contribute to further improvement of the mechanical properties in particular.

The mixture of the invention may also have a component E'). Like component E), component E') is an optional constituent in the novel mixture.

Component E') is given by phosphates, which may be valuable for the further processing or the plastification of the biopolymer mixture and for enhancing the mechanical properties of the products produced therefrom.

As mentioned, component E') according to the invention is given by phosphates. For the purposes of the present invention, these are salts or esters of the various phosphoric acids. However, the salts of the various phosphoric acids are by far preferable for the invention. According to the invention, the component E') used may comprise one or more salts and/or esters of the various phosphoric acids, and therefore one or more phosphates may form component E').

Compounds which may be used successfully as component E') are, inter alia, orthophosphates of the formulae $M'H_2PO_4$ (e.g. $NaH_2PO_4$) and $M''(H_2PO_4)_2$ [e.g. $Ca(H_2PO_4)_2$], secondary orthophosphates of the formulae $M'_2HPO_4$ or $M''HPO_4$ (e.g. $K_2HPO_4$, $CaHPO_4$) or tertiary orthophosphates of the formulae $M'_3PO_4$ or $M''_3(PO_4)_2$ [e.g. $Na_3PO_4$, $Ca_3(PO_4)_2$], where $M'$ is a monovalent cation, such as $^+NRR'R''R'''$, where R, R', R" and R''', independently of one another, are identical or different and are hydrogen, $(C_1-C_8)$-alkyl, linear or branched, $(C_4-C_8)$-aryl, preferably phenyl, an alkali metal ion, preferably $Na^+$ or $K^+$, and $M''$ is a bivalent cation, preferably an alkaline earth metal ion, particularly preferably $Ca^{2+}$.

Also of particular interest as component E') is the group of condensed phosphates deriving from the acid salts of orthophosphoric acid and produced on heating, with evolution of water. These can be subdivided in turn into metaphosphates (systematic terminology: cyclopolyphosphates) and polyphosphates (systematic terminology: catenapolyphosphates).

Preferred examples include Graham's salt, Kurrol's salt and Maddrell's salt, and also fused or calcined phosphates.

Particularly useful modifiers E') are, inter alia, metaphosphates of the formula $M'_n[P_nO_{3n}]$, where $M'$ is a monovalent cation, preferably a metal ion, usefully an alkali metal ion, preferably $Na^+$ or $K^+$, or $^+NRR'R''R'''$, where R, R', R" and R''', independently of one another, are identical or different and are hydrogen, $(C_1-C_8)$-alkyl, linear or branched, or $(C_4-C_8)$-aryl, preferably phenyl, and n is a positive integer, preferably within the range from 3 to 10. Among these, preference is in turn given to metaphosphates in which n is 3, 4 or 5 and $M'$ is sodium or potassium. Most preference is given to sodium trimetaphosphate, sodium tetrametaphosphate and sodium pentametaphosphate.

Advantageous mixtures are also obtained with polyphosphates of the formula $M'_{n+2}[P_nO_{3n+1}]$ or $M'_n[H_{2n}P_nO_{3n+1}]$, where $M'$ is a monovalent cation, preferably a metal ion, usefully an alkali metal ion, preferably $Na^+$ or $K^+$, or $^+NRR'R''R'''$, where R, R', R" and R''', independently of one another, are identical or different and are hydrogen, $(C_1-C_8)$-alkyl, linear or branched, or $(C_4-C_8)$-aryl, preferably phenyl, and n is a positive integer greater than 2. Among these, preference is given to sodium polyphosphates and potassium polyphosphates in which n>10.

Mixtures with advantageous properties may also be obtained by using, as component E'), polyphosphates of the formula $M'_{n+2}[P_nO_{3n+1}]$, where $M'$ is a monovalent cation, preferably a metal ion, usefully an alkali metal ion, preferably $Na^+$ or $K^+$, or $^+NRR'R''R'''$, where R, R', R" and R''', independently of one another, are identical or different and are hydrogen, $(C_1-C_8)$-alkyl, linear or branched, or $(C_4-C_8)$-aryl, preferably phenyl, and n is a positive integer from 3 to 10. Among these preference is given, inter alia, to pentasodium tripolyphosphate.

An advantageous modification of the novel thermoplastic mixture is obtained if E') is sodium trimetaphosphate, sodium metaphosphate, sodium polyphosphate and/or sodium hexametaphosphate, preferably sodium polyphosphate.

The mixtures of the invention may be specified via their composition in percent by weight.

However, the mixing components do of course interact with one another when mixed, and therefore on some occasions the finished thermoplastic mixture based on biopolymers may comprise an altered form of some components.

The invention therefore also provides a thermoplastic mixture based on biopolymers and obtainable by preparing and mixing A) 100 parts by weight of one or more physiologically nonhazardous, biodegradable, thermoplastically processable polymeric materials selected from the class consisting of polysaccharides and proteins, preferably at least one starch of any type which is native, chemically modified, fermentative, recombinant and/or prepared by biotransformation, and/or derivatives of the starches mentioned;

B) from 10 to 100 parts by weight of water;

C) from 1 to 100 parts by weight of lignin;

D) if desired, up to 50 parts by weight, based on 100 parts by weight of the total of components A) to C), of one or more plasticizers; and E) if desired, up to 200 parts by weight, preferably not more than 100 parts by weight, based on 100 parts by weight of the total of components A) to C), of other conventional additives;

where the mixing of the components takes place with introduction of thermal and mechanical energy into the thermoplastic mixture.

It should be emphasized here that the mixing of components A) to E) with one another in the novel mixture is carried out with introduction of thermal and mechanical energy into the thermoplastic mixture.

The mechanical and the thermal energy are preferably introduced simultaneously, e.g. by working at an elevated temperature and simultaneously exerting shear forces on the thermoplastic mixture to be plastified and based on biopolymers, preferably starch.

Better homogeneity of the mixtures is generally obtained at relatively high temperatures. However, to avoid unnecessary discoloration or decomposition of the molding compositions, the temperatures should not be too high. In this context, mixing at temperatures within the range from >60° C. to 220° C. is the preferred form of thermoplastic mixing according to the invention.

Fundamentally, the homogenization of the mixture increases with the work introduced. This means that as the work introduced into the mixing assembly increases, the homogenization of the thermoplastic mixture improves. A further modification of the invention therefore provides a mixture obtainable by mixing using strongly shearing mixing assemblies. The energy introduced into the mixture may be derived in particular from the work done by the processing machinery used. For example, an apparatus whose plasticating element has a torque within the range from 5 to 300 Nm (1 Newton meter) is particularly suitable for the process. A torque within the range from 10 to 100 Nm has proven advantageous for the process. Preference is given to carrying out the process with a torque within the range from 20 to 40 Nm.

Particularly advantageous take-up of thermal and/or mechanical energy by the mixture is achieved if the constituents of the novel mixture are mixed and homogenized in a plastics-processing machine, such as an extruder, kneader or a similar assembly. The process may preferably be carried out in single- or twin-screw extruders preferably assembled from individual barrels which have temperature-controlled jackets. There is no restriction on the design of the screws. There may be conveying elements (with or without thrust edges), kneading elements and/or mixing elements. It is, furthermore, possible and frequently advantageous to have elements which are flow-restricting or reverse-conveying elements in some parts, i.e. some sections, in the extruder, to adjust and control residence time and the properties of the mixture.

Under certain circumstances the sequence of mixing the ingredients A) to E) may also have particular significance. The invention therefore also provides a process for preparing a thermoplastic mixture based on biopolymers, preferably starch, in which A) 100 parts by weight of one or more physiologically nonhazardous, biodegradable, thermoplastically processable polymeric materials selected from the class consisting of polysaccharides and proteins, preferably at least one starch of any type which is native, chemically modified, fermentative, recombinant and/or prepared by biotransformation, and/or derivatives of the starches mentioned;

B) from 10 to 100 parts by weight of water;

C) from 1 to 100 parts by weight of lignin;

D) if desired, up to 50 parts by weight, based on 100 parts by weight of the total of components A) to C), of at least one plasticizer; and E) if desired, up to 200 parts by weight, preferably not more than 100 parts by weight, based on 100 parts by weight of the total of components A) to C), of other conventional additives;

are prepared and mixed with one another, where the components are thermoplastified with introduction of thermal and mechanical energy into the mixture, preferably at an elevated temperature and with simultaneous exertion of shear forces onto the mixture.

The novel thermoplastic molding composition may be processed by known processing methods to give products. For example, in a first step it may be pelletized.

The invention therefore also provides pellets which can be obtained from the thermoplastic mixture according to the invention by extrusion and pelletization.

It is also possible, either directly or by further thermoplastic processing of thermoplastic pellets, to obtain moldings or films with good biodegradability and improved properties, preferably improved mechanical properties.

Finally, the invention also includes the use of the thermoplastic mixtures for producing moldings or films.

The novel products therefore cover a wide variety of possible applications. These include specifically adhesives for paper and corrugated board, shaped articles produced by injection molding, especially rods, tubes, bottles, capsules, pellets, additives for food or drink, foils, in the form of coatings or free-standing foils, also in the form of laminates, especially films, packaging materials, bags, release-slowing materials for controlled release of active substances in general, in particular drugs, pesticides or other active substances used in agriculture, fertilizers, aromatic substances, etc. The release of the active substance here may take place from foils, films, tablets, particles, microparticles, rods or other extrudates or other shaped articles.

More preferred applications include packaging for food or drink, in particular casings or wrappings for sausages or cheese, absorbers, powders and the like.

In a particular embodiment, the novel thermoplastic mixtures are used to produce shaped articles for the controlled release of active substances, for example tablets or dragees.

Another expedient and particularly advantageous use of the novel thermoplastic mixture relates to the production of shaped articles which are suitable for producing solid shaped articles, hollow articles or combinations of these.

Another excellent use of the novel thermoplastic mixture is for producing films for use in agriculture.

Another particular variant of the invention is the use of the thermoplastic mixture for producing films for use in food or drink applications.

Another specific use of the thermoplastic mixture is for producing films for use as an outer packaging for food or drink.

One more highly advantageous use of the novel thermoplastic mixture is in producing films for use as a packaging for food or drink where the packaging has full surface contact with the food or drink.

A final particularly advantageous use of the novel thermoplastic mixture is in producing flat or tubular films for use as food casings or wrappings for sausage or cheese.

The examples below illustrate the subject matter of the invention.

EXAMPLE 1
Preparation of a Thermoplastically Processable Blend Made from Potato Starch, Lignin, Glycerol and Glyoxal The compounds are prepared in a commercially available kneading assembly (Brabender Kneader). The kneading assembly is heated to 100° C. 30 g of potato starch (Toffena from Sudstarke) form the initial charge. 15 g of water are then added and homogenized with the starch initially charged. After about 5 minutes, 3 g of lignin and 9 g of glycerol are added. After a further 5 minutes, 3 g of glyoxal (40% strength aqueous solution) are added to the mixture. After about 10 minutes, once homogenization has taken place, the molding composition is removed while the apparatus is still in its heated condition. The molding composition is amber-colored and predominantly homogeneous, and can be further processed directly.

By melting the molding composition using a press (see Example 2) it is possible to obtain homogeneous transparent solid films with exceptional breaking strength. The films have an organic surface, i.e. a roughness which is pleasant to the touch, and a natural texture. The films have a pleasant, slightly sweetish, aromatic odor.

EXAMPLE 2
Production of Films Using Compression Molding Technology from Thermoplastic Molding Compositions which Comprise Lignin For this purpose use is made of a commercially available Schwabenthan (Polystat 300 S) press. The press is preheated to 100° C. The preparation of the specimens uses a "sandwich technique" between two fabric-reinforced polytetrafluoroethylene (PTFE, ®Teflon) sheets held apart by a metal frame of about 100 $\mu$m thickness. As preparation, about 2 g of the composition prepared in the kneader are placed in the middle of the lower sheet. The specimen is held for 5 minutes at a temperature of 100° C. and a pressure of 1 t. The specimen is then compression molded at 100° C. for 5 minutes at a pressure of 10 t. This corresponds to a pressure of 200 bar. The pressure is removed and the specimen is transferred to another press for cooling. This is a water-cooled press from Robert Fuchs Hydraulische Maschinen und Werkzeuge. A pressure of 50 bar is applied during the cooling procedure for a period of 2 minutes. The specimen can then be removed for use in further tests. It should be noted that, depending on the hydrophilicity of the materials used, storage in air gives rise to aging phenomena attributable to variations in water content.

EXAMPLE 3
Preparation of a Thermoplastically Processable Blend Made from Potato Starch, Casein, Lignin, Glycerol and Sodium Polyphosphate The compounds are prepared in a commercially available kneading assembly (Brabender kneader). The kneading assembly is heated to 100° C. 30 g of potato starch (Toffena from Südstarke) and 6 of casein form the initial charge in the kneader. 15 g of water are then added and homogenized with the mixture initially charged and made from starch and protein. After about 5 minutes, 3 g of lignin and 6 g of glycerol are added. After a further 5 minutes, firstly 0.9 g of $Na_2CO_3$ in 2 ml of water and then 1.2 g of sodium polyphosphate (Riedel de Haan) dissolved in 5 ml of water are added. After about a further 10 minutes, once homogenization has taken place, the molding composition is removed while the apparatus is still in its heated condition. The molding composition is brown and predominantly homogeneous. The strength of this molding composition makes it predominantly suitable for injection molding, and the products which it gives have high dimensional stability.

EXAMPLE 4
Preparation of a Thermoplastically Processable Blend Made from Corn Starch, Lignin, Cellulose, Glycerol and Glyoxal The compounds are prepared in a commercially available kneading assembly (Brabender kneader). The kneading assembly is heated to 130° C. 20 g of lignin form the initial charge. 15 g of water are then added and homogenized with the initial charge of lignin. After about 15 minutes, 20 g of corn starch (Maize Starch from National Starch) are added to the mixture and kneaded for 15 minutes. 1 g of cellulose powder is then added to the mixture, followed about 3 minutes later by 8 g of glycerol. 0.4 g of glyoxal (40% strength aqueous solution) is added to the homogenized composition. After about 10 minutes, the molding composition is removed from the apparatus, which is still in its heated condition. The molding composition has a dark color, is soft, homogeneous and flexible, and can be further processed to give shaped articles or films.

EXAMPLE 5
Preparation of a Thermoplastically Processable Blend Made from Potato Starch, Lignin and Glycerol The compounds are prepared in a commercially available kneading assembly (IKA Duplex kneader). The kneading assembly is heated to 130° C. 150 g of potato starch (Toffena from Südstärke) form the initial charge in the kneader. 90 g of water are then added and homogenized with the initial charge of starch. After about 20 minutes, 22.5 g of lignin are added to the mixture. The mixture is kneaded for 10 minutes. 22.5 g of glycerol are then added. After a further 10 minutes, once a homogeneous composition has been produced, the experiment is ended. The thermoplastic molding composition is removed while the apparatus is still in its heated condition. The molding composition is brown, homogeneous and flexible.

The strength of this molding composition makes it predominantly suitable for injection molding, and the objects which it produces have very high dimensional stability.

Other advantages and embodiments of the invention are given in the claims below.

What is claimed is:

1. A thermoplastic mixture based on starch for producing shaped biodegradable articles with improved mechanical properties, wherein an effective amount of lignin and sufficient water for plastification are present.

2. A thermoplastic mixture as claimed in claim 1, wherein the ratio by weight of lignin to starch is within the range of 1:1000 to 1:1.

3. A thermoplastic mixture as claimed in claim 1, wherein the starch is selected from the group consisting of starch which is native, chemically modified, obtained by a fermentative process, obtained by a recombinant process and/or prepared by biotransformation, derivatives of the types of starch mentioned, mixtures of one or more of the above-mentioned starches with one or more derivatives of starch.

4. A thermoplastic mixture as claimed in claim 1, wherein the lignin is an alkali lignin.

5. A thermoplastic mixture as claimed in claim 1, comprising

A) from 33 to 90% by weight of one or more biodegradable, thermoplastically processable starches;

B) from 5 to 35% by weight of water;

C) from 0.5 to 35% by weight of lignin;
where components A) to C) together give 100% by weight;
and also, if desired, D) up to 50 parts by weight, based on 100 parts by weight of the total of components A) to C), of one or more plasticizers; and E) up to 200 parts by weight, based on 100 parts by weight of the total of components A) to E), of other conventional additives.

6. A thermoplastic mixture as claimed in claim 5, wherein the amount of component C) present in the mixture is at least 1% by weight.

7. A thermoplastic mixture as claimed in claim 5, wherein the amount of component C) present in the mixture is within the range from 2.5 to 25% by weight.

8. A thermoplastic mixture as claimed in claim 1, obtainable by preparing and mixing A) 100 parts by weight of one of more biodegradable, thermoplastically processable starches, B) from 10 to 100 parts by weight of water;

C) from 1 to 100 parts by weight of lignin;

D) if desired, up to 50 parts by weight of one or more plasticizers;

and

E) if desired, up to 200 parts by weight, of other conventional additives;

where the mixing of the components takes place with introduction of thermal and mechanical energy into the thermoplastic mixture.

9. A thermoplastic mixture as claimed in claim 8, which is obtainable by mixing at temperatures within the range from >60° C. to about 220° C.

10. A thermoplastic mixture as claimed in claim 8, which is obtainable by mixing using strongly shearing mixing assemblies having plastifying elements which can achieve torques within the range from 10 to 100 Nm.

11. A process for preparing a thermoplastic mixture based on starch, in which

A) 100 parts by weight of one or more biodegradable, thermoplastically processable starches, B) from 10 to 100 parts by weight of water;

C) from 1 to 100 parts by weight of lignin; and

D) if desired, up to 50 parts by weight of at least one plasticizer;

and

E) if desired, up to 200 parts by weight, of other conventional additives;

are prepared and mixed with one another, where the components are thermoplastified with introduction of thermal and mechanical energy into the mixture.

12. A pelletized material obtainable from the thermoplastic mixture as claimed in claim 1 by extrusion and pelletization.

13. A biodegradable molding or film with improved properties comprising the thermoplastic mixture as claimed in claim 1.

14. A thermoplastic mixture as claimed in claim 8, wherein the starch used comprises a physiologically non-hazardous starch.

* * * * *